J. & F. A. MICHALKA.
STALK CUTTER.
APPLICATION FILED AUG. 8, 1908.

957,620.

Patented May 10, 1910.
5 SHEETS—SHEET 1.

WITNESSES

INVENTORS
Joseph Michalka
Frank A. Michalka
BY
ATTORNEYS

J. & F. A. MICHALKA.
STALK CUTTER.
APPLICATION FILED AUG. 8, 1908.

957,620.

Patented May 10, 1910.
5 SHEETS—SHEET 5.

WITNESSES

INVENTORS
Joseph Michalka
Frank A. Michalka
BY
ATTORNEYS

UNITED STATES PATENT OFFICE.

JOSEPH MICHALKA AND FRANK A. MICHALKA, OF CAMERON, TEXAS.

STALK-CUTTER.

957,620.

Specification of Letters Patent.

Patented May 10, 1910.

Application filed August 8, 1908. Serial No. 447,611.

*To all whom it may concern:*

Be it known that we, JOSEPH MICHALKA and FRANK A. MICHALKA, both citizens of the United States, and residents of Cameron, in the county of Milam and State of Texas, have invented a new and Improved Stalk-Cutter, of which the following is a full, clear, and exact description.

This invention relates to certain improvements in machines for cutting corn, cotton and similar stalks standing on the field, which stalks may be green or dry; but the machine is more particularly adapted for cutting the stalks while green.

The purpose of the invention is to provide a machine that will not only cut standing stalks at a point near the ground; but which will practically at the same time cut the stalks in very short pieces, rendering it easy to plow the stalks under to enrich the soil, while any fragments that may remain on the surface will not in any manner interfere with the cultivation of a crop.

A further purpose of the invention is to provide a stalk cutter that can be successfully used upon a hill side and upon very rocky ground, since none of the cutting elements under any condition of service will contact with the ground.

It is also a purpose of the invention to provide means for directing the cutters to the stalks, whether the stalks be in an upright or in an inclined position, or whether they be all in alinement or practically in staggered order.

It is also a purpose of the invention to provide a machine of the character described that will be comparatively simple and economic in construction, and which will in operation not only cut the stalks in short lengths, but which at the same time will longitudinally render apart the transversely cut sections.

The invention consists in a device of the character described wherein coöperating spiral and horizontally located cutters are employed, driven by the movement of the machine, that simultaneously cut and sliver the stalks in the path of the machine, and wherein further adjustable devices are readily operated to guide the cutters to the stalks, and wherein the driver's seat is rendered comfortable and all levers are in easy reach from the seat.

In the drawings that serve to illustrate our invention, we have shown a machine having cutters operated by special gearing actuated from the axle of the machine and cutters of a special type. We, however, desire to be understood as not limiting ourselves to the particular construction shown, since the invention is capable of use in connection with analogous constructions, and certain features of the invention may be applied to other devices or apparatus to obtain practically the same results.

The novel features of the invention will be carefully defined in the claims.

In the drawings.

Like characters of reference indicate corresponding parts in all the views.

As herein shown, the improved stalk cutter is constructed with a main frame or carriage comprising spaced, longitudinal and horizontally-directed bars or members 10, 10, the forward ends of which converge for attachment to a tongue as clearly shown at 11, and the rear ends of which have integral downwardly-directed parts 12, 12, the lower extremities of which carry spaced alined boxes 14, 14, through which is passed the driving axle 15, the ends of which carry traction wheels 16, 16, adapted to roll upon the earth for the support of the improved stalk cutter and being also adapted to continuously turn said axle 15 for the actuation of the various operative parts as will be hereinafter explained.

17, 17, represent connected angular braces extended between the boxes 14, 14, and projecting rearwardly and upwardly behind the axle 15, the connected rear parts of these braces 17 having connection as shown at 19 with a seat supporting bar 18, inclined upward at the rear part of the machine and carrying the driver's seat as shown at 20.

25 represents an open frame of general rectangular formation which is vertically positioned in the improved machine, and has its opposite vertically extended side bars provided with bearings which are arranged to turn or rock loosely upon the driving axle 15 adjacent to the boxes 14, 14, in such a manner that the said frame 25 is adapted for rocking or swinging movement upon said axle. This frame 25 forms one element of an adjustable support for the cutting mechanism comprised in the improved stalk cutter, another element of such adjustable support being formed of another frame 35 extended in front of the driving axle and set at an inclination to the frame 25, as shown in Fig. 4, such frame 35 having a lower arm 36, the extremity of which has a vertically-extended pivotal bearing at the center of the lower part of the frame 25, as shown at 26 in Figs. 3 and 4, and said frame 35 being further provided with spaced rearwardly-directed arms 37, 37, above the arm 36, and apertured to afford bearings for the upper end portion of a shaft or stud 27, held to turn at the center of the upper part of the frame 25 in alinement with the pivot bearing 26 at the base of said frame 25. By this arrangement it will be seen that the support formed of the two frames 25 and 35 is of such a nature as to be capable of universal movement relative to the main frame of the machine in order to accommodate the cutting mechanism to the exigencies of the work, the said support being adapted to swing concentrically about the axle 15 for the adjustment of the cutting mechanism in a vertical direction, and being also adapted to swing upon the pivotal connections of the frame 35 with the frame 25, which are at right angles to the driving axle, in order to permit the adjusting movement of the cutting mechanism in lateral directions.

29 represents a rearwardly-extended slide rod, the forward end of which has pivotal connection as shown at 28 with the lower end of the frame 25, and the rear end of which is arranged to slide through an eye or guide 31 upon the connected rear ends of the diagonal braces 17, and 30 represents a spring coiled upon said rod 29 with its forward end engaged upon a shoulder or collar at the forward part of said rod and its rear end abutting upon the guide 31, in such a manner that the tension of said spring 30 is exerted to yieldingly retain the frame 25 in a substantially vertical position upon the axle and to partially counterbalance the cutting mechanism connected with the frame 35, so as to enable the improved stalk cutter to be the more readily drawn over the field.

Figures 5, 6, 7, 8, 9:
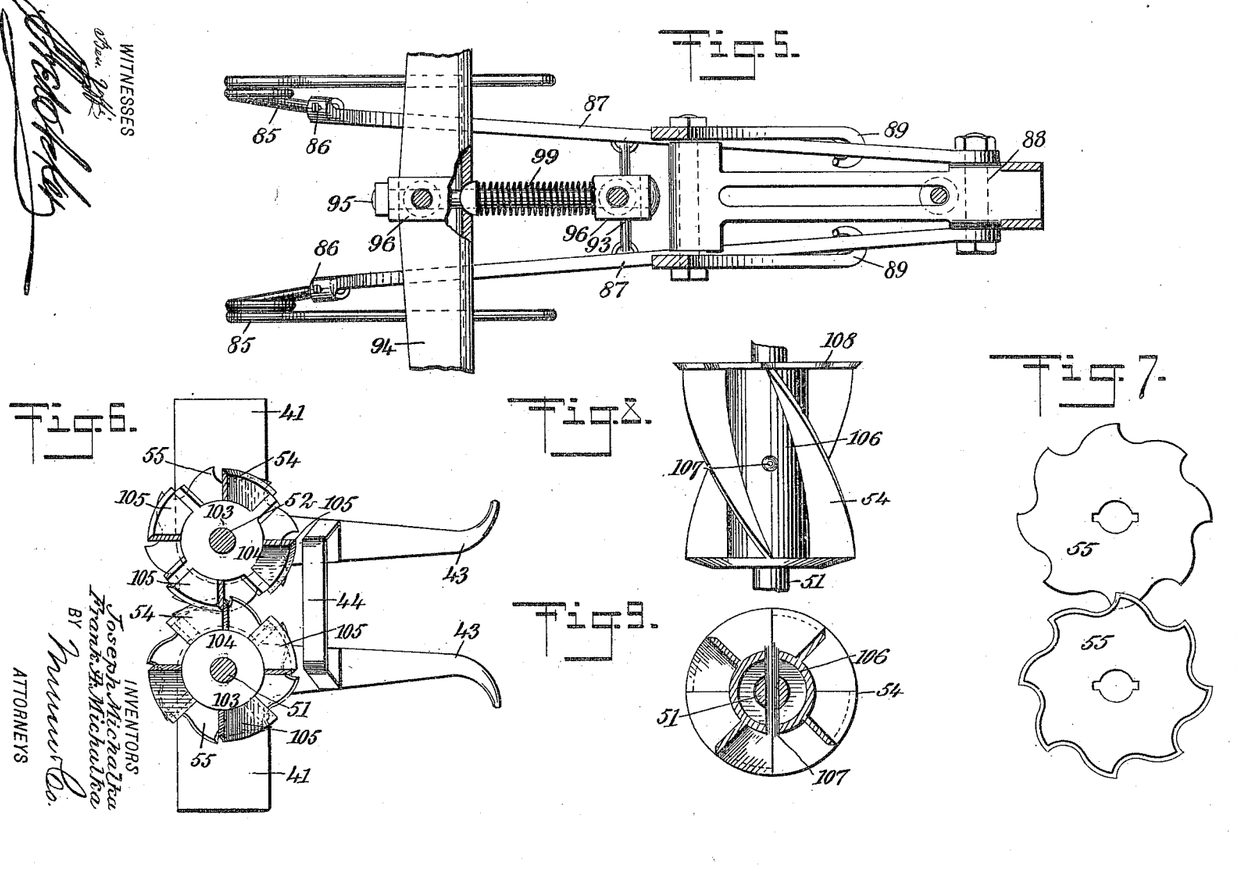
Fig. 5 is a detail sectional view of the draft and guide devices to the cutters, the sections being taken substantially on the line 5—5 of Fig. 1.
Fig. 6 is a horizontal section through the cutting mechanism taken practically on the line 6—6 of Fig. 4.
Fig. 7 is a plan view of opposing horizontal cutters detached from their supports.
Fig. 8 is a side elevation of one section of a cutter showing a modified form of construction.
Fig. 9 is a horizontal section through the cutter shown in Fig. 8.

38 represents a downwardly and forwardly inclined yoke, the rear bowed part of which has adjustable connections as shown at 39, with the opposite sides of the lower arm 37 of the frame 35, and the lower ends of the forwardly directed arms of which have slide bearings 40 wherein are adjustably held by means of set screws 42, the opposite outer ends of base plates 41, 41, extended toward each other and having bearings in which the vertically-extended parallel cutter shafts 51 and 52 are arranged to turn. These base plates 41, 41, form lower supports or carriers for the cutting mechanism, and to permit the stalks to pass between the cutters held upon the shafts 51, 52, the adjacent ends of said plates 41, 41, are spaced apart from each other and are provided with forwardly-extended guide projections 43, 43, the front extremities of which are made to diverge, as clearly shown in Fig. 6, in order to engage the stalks and bend the same laterally in a manner to deliver them satisfactorily to the cutting mechanism upon the shafts 51 and 52.

44 represents an upwardly bowed tie bar or brace, affording a strengthening connection between the guide projections 43, 43; and 47, 47, represent other braces extended obliquely from the forward extremities of the projections 43, 43, in a rearwardly and upwardly inclined direction and connected with the opposite sides of a vertically-extended yoke 45, which is supported at its base upon the lower ends of the arms of the yoke 38, and is extended up behind and parallel with the shafts 51 and 52, and has adjustable connection with the forward part of the frame 35 at its upper end, as clearly shown at 46, 46, in the drawings. The upper end of the vertical yoke 45 carries a forwardly-extended bracket provided with divergent forks 48, 48, whereon are adjustably held, as shown at 49, bearing pieces 50, 50, wherein the upper ends of the respective shafts 51 and 52 are held to turn, the arrangement of these parts being such that the adjustable connections 49 of the bearing pieces 50, 50, with the divergent arms or forks 48 of the bracket, are capable of being varied in order to permit of adjusting the upper ends of the shafts 51 and 52 nearer to or farther from each other, in order to accommodate wear of the cutting mechanism carried upon such shafts and also to accommodate such mechanism for operation upon stalks of different sizes and kinds. A similar adjustment is attainable at the lower ends of the shafts 51 and 52, by moving the plates 41, 41 nearer to or farther from each other, the braces 44 and 47 having sufficient resilience to permit such adjustment.

The preferred arrangement of the cutting mechanism shown herein, comprises spiral knife sections 54 and cutter disks 55, alternately arranged upon the vertical shafts 51 and 52, in such a manner as to operate to draw the stalks between them and to sever the same into short lengths or sections, such as are adapted to be conveniently turned beneath the surface in plowing or which are adapted if left exposed, to decay quickly so as not to breed insect pests and thereby interfere with future cultivation.

The adjustable connection at 46 between the upper end of the vertical yoke 45 and the forward upwardly-inclined end of the frame 35, permits the said yoke to be adjusted to a vertical or to a rearwardly-inclined position. Such adjustment we have discovered is of advantage in order to adapt the improved machine for cutting different kinds of stalks, as for example corn and cotton stalks. A similar result may also be attained by the adjustable connection 39 of the yoke 38 with the frame 35.

56, 56, represent supporting wheels or rollers held on arms 57 pivotally connected as shown at 58 with the bearings 40 at the lower ends of the arms of the yoke 38, whereby said wheels or rollers afford a rolling support for the frame construction whereon the cutting mechanism is carried. 59, 59, represent links with the lower ends coupled to the arms 57 and the upper ends coupled to the cranks at the ends of a rock shaft 60, journaled transversely on the frame 35 and provided with a lever 61 at one end, whereby said shaft may be rocked by the driver sitting on the seat 20. This lever 61 has a detent 62 engageable with a segment rack 63, whereby the shaft 60 may be effectively held in adjusted position. By rocking the shaft 60, the arms 57 may be raised or lowered, so as to vary the elevation of the cutting mechanism above the ground, so that the stalks may be cut nearer or farther from the ground as may be desired.

The means for actuating the operative parts of the machine from the driving axle, comprises a bevel gear wheel 71 held to turn in unison with the axle 15 but capable of a limited extent of movement lengthwise thereon, being arranged within the open rectangular frame 25 and adapted to be moved in and out of meshing engagement with a bevel pinion 70, carried upon the lower end of the shaft or stud 27, whereon the spaced arms 37 of the frame 35 swing pivotally. A spring 73 upon the axle exerts its tension to hold the wheel 71 normally moved over to disengage its teeth from the pinion 73, while the wedge-shaped end 74 of a controlling lever 75, extended adjacent to the driver's seat in convenient position to be depressed and rocked by the driver's foot, is engageable with the boss of said gear wheel 71 in such a manner as to force said wheel lengthwise on the axle to an extent sufficient to engage it with the pinion 70 when said lever 75 is rocked. By this arrangement, it will be seen that the movement of the stud or shaft 27 from which the cutting mechanism is operated as will be hereinafter explained, is under the convenient control of the driver at all times.

Figure 1:
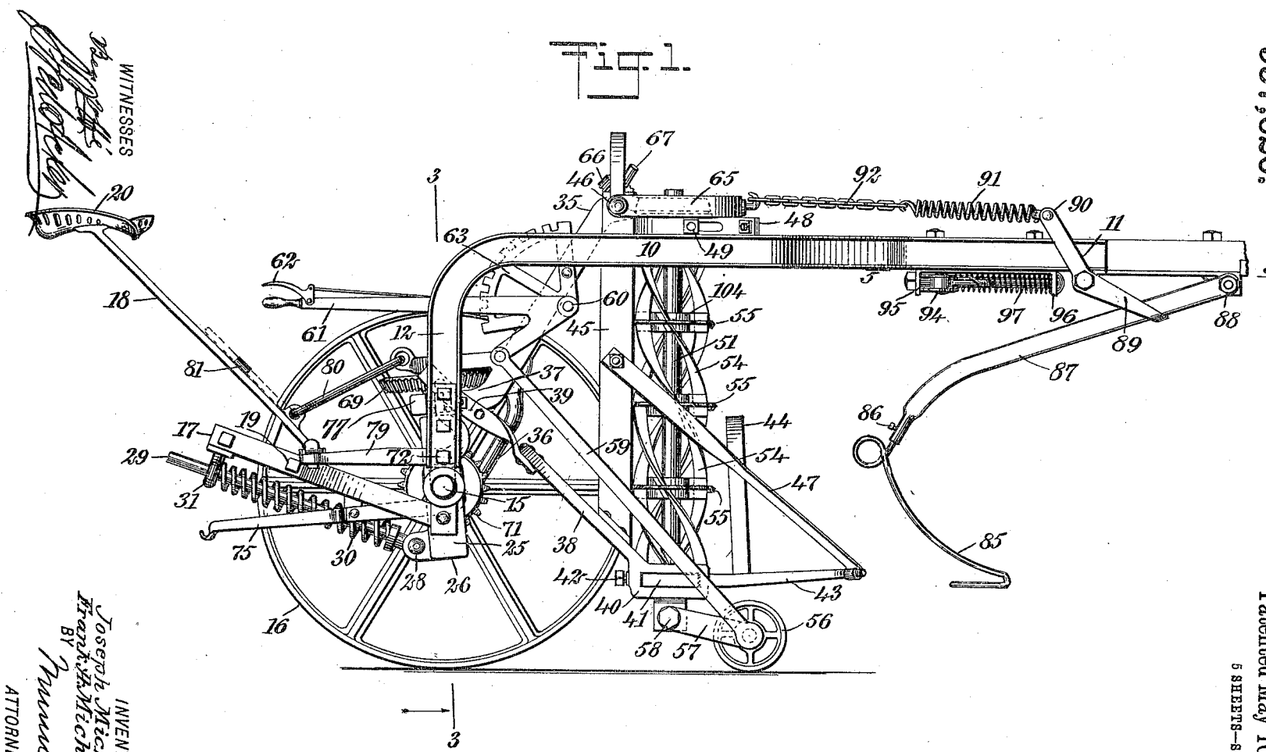
Figure 1 is a side elevation of the improved machine.
Figure 2:
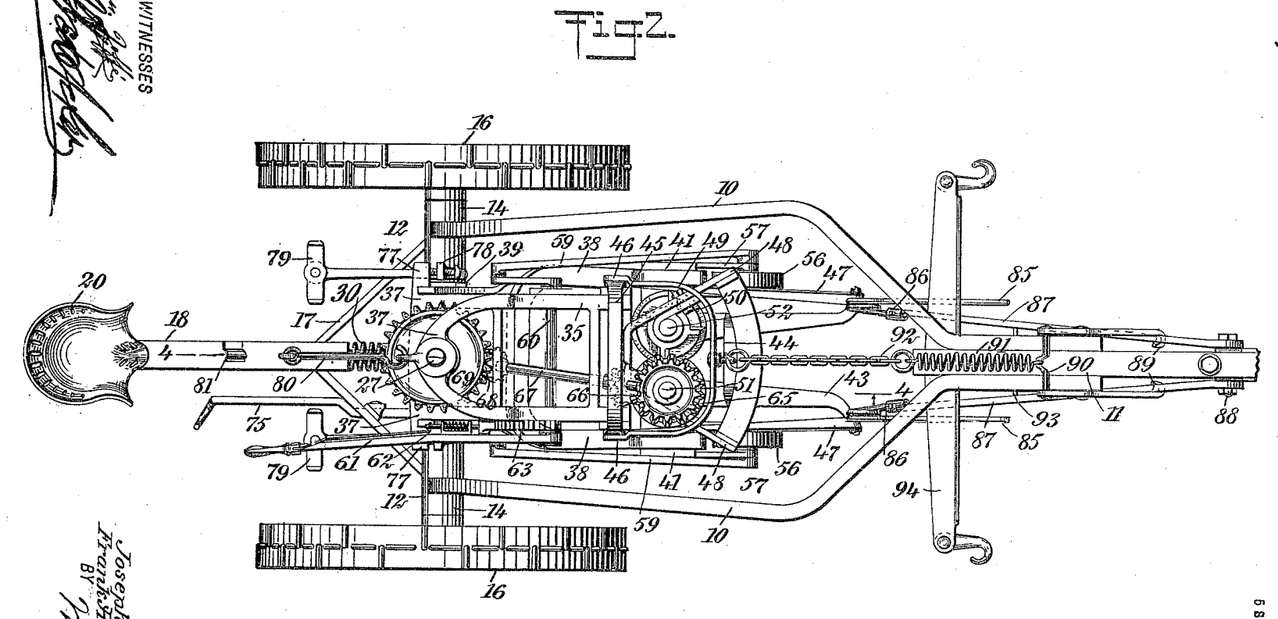
Fig. 2 is a plan view of the same.

69 represents a bevel gear wheel held in the upper part of the stud or shaft 27 between the arms 37, 37, of the frame 35, and 68 represents a bevel gear pinion meshing with said wheel 69 and held on the lower end of a shaft 67 journaled in the frame 35 and extended in an upwardly-inclined direction whereby its upper end is brought into position adjacent to the upper end of the vertical cutter shaft 51. Said upper end of the shaft 67 carries a bevel gear pinion 66 meshing wih a bevel gear wheel 65 held on said cutter shaft 51, whereby movement is communicated to turn the same. The upper end of the shaft 52 is also provided with a gear wheel $65^a$ meshing with the wheel 65, so as to compel the vertical cutter shafts to rotate in unison. This wheel $65^a$ is omitted in Fig. 2 to illustrate the underlying parts.

In the operation of the improved machine, as the same is drawn across the field, the driver may vary the elevation of the cutting mechanism above the ground to suit the varying requirements, by the manipulation of the lever 61, and may depress the foot lever 75 in order to permit the cutting mechanism to be continuously operated to cut the stalks in the path of the machine, in small pieces as above described. At the same time, by reason of the particular arrangement of the pivotal connections between the frames 25 and 35, the cutting mechanism connected with the last-named frame may be swung laterally from side to side of the path in which the machine is drawn, so as to permit the guide projections 43, 43, to engage the stalks and deflect the same in such manner as to insure their proper application to the cutting mechanism. To permit of controlling such lateral swinging movement of the cutting mechanism, and of the frame 35 with relation to the frame 25, we provide foot levers 79, at the opposite sides of the machine and in convenient position to be depressed by the feet of the driver sitting on the seat 20, which levers 79 are pivoted as shown at 72 at the opposite sides of the frame 25 and have upwardly-extended arms 78, 78, which are engageable behind the lugs 77, projecting from the opposite sides of the lower arm 37 of the frame 35, whereby it will be seen that when the operator depresses one lever 79, the arm 78 thereof is caused to press upon the corresponding side of the rock frame 35 on the frame 25 and swing the cutting mechanism in one direction. When the other lever 79 is depressed, the cutting mechanism is reversely swung, and by varying the pressure upon the two levers, the driver may so move the cutting mechanism as to cut stalks growing irregularly as well as those in rows. The arms 78 may be provided with set screws whereby to render it possible to facilitate the adjustment of the levers 79.

At the forward part of the machine, we provide further auxiliary means for guiding the stalks to the guide projections 43, 43, such auxiliary means comprising resilient bent arms or wires 85, 85, alined with the forward parts of the guide projections 43, 43, and having adjustable connection at 86, 86, with the lower ends of the inclined bars 87, 87, the upper, forward ends of which are pivoted upon a plate 88 adjustable lengthwise of the tongue of the machine. The bars 87, 87, are prevented from spreading apart by means of a link or tie 93 extended between them and their central parts. The bars 87, 87, are supported upon the hook-shaped lower ends of the levers 89, 89, pivoted at the rear part of the plate 88, and having their upper ends connected as shown at 90 with a spring 91, the rear end of which is coupled by a chain 92 or equivalent connection with the yoke 45 for the cutting mechanism, in such a manner that the tension of said spring is exerted to hold the bars 87 and resilient arms 85 elevated above the ground, and in position for yielding engagement with the stalks to guide the same to the guide projections 43, 43, so that the stalks may be properly presented to the cutting mechanism.

In the drawings we have shown the improved stalk cutter provided with a doubletree 94 for the connection of a team therewith, and by preference this doubletree has at its central part sliding engagement with a rod 95 extended lengthwise beneath the tongue, with its ends secured to the opposite bent ends of a clip 96 secured at the underside of said tongue, a spring being coiled around said rod between the doubletree 94 and the forward bent end of the clip, in such a manner as to prevent damage to the machine from contact with obstructions in the field and to lessen and ease the strain upon the draft animals in starting.

Figure 3:
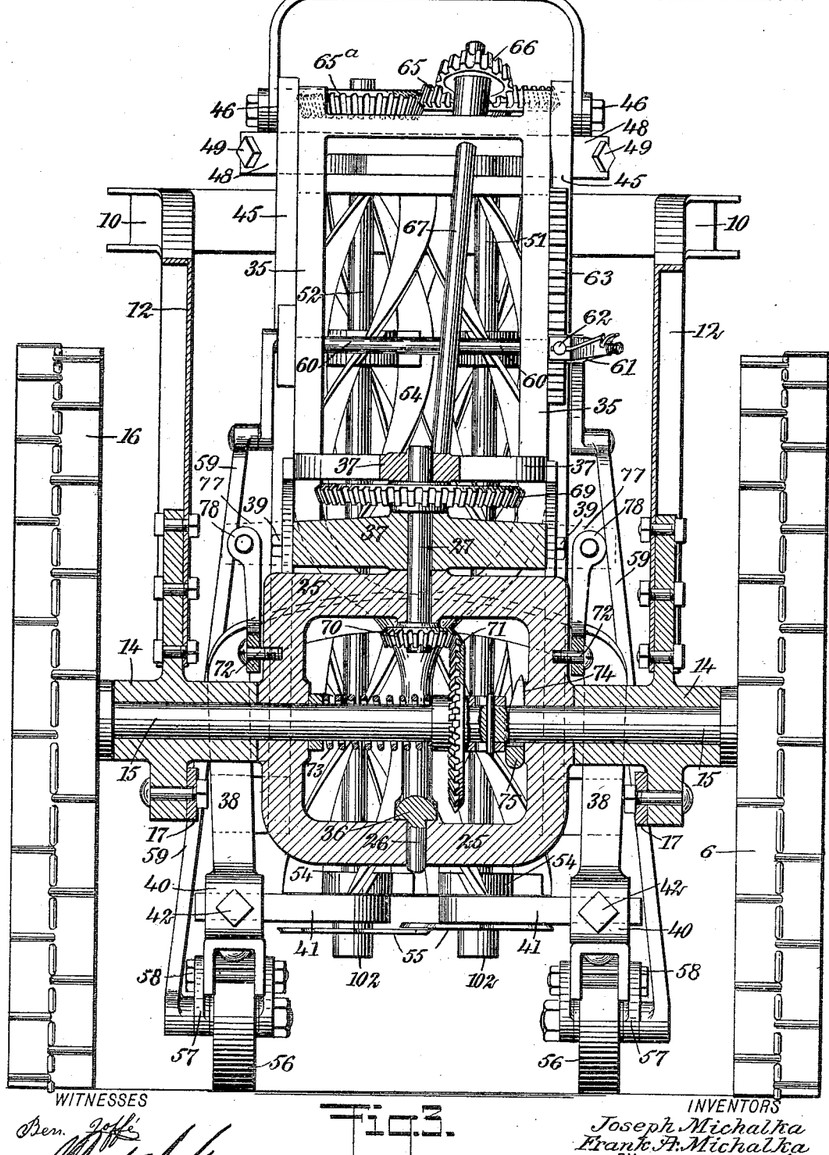
Fig. 3 is an enlarged vertical transverse section taken practically on the line 3—3 of Fig. 1.
Figure 4:
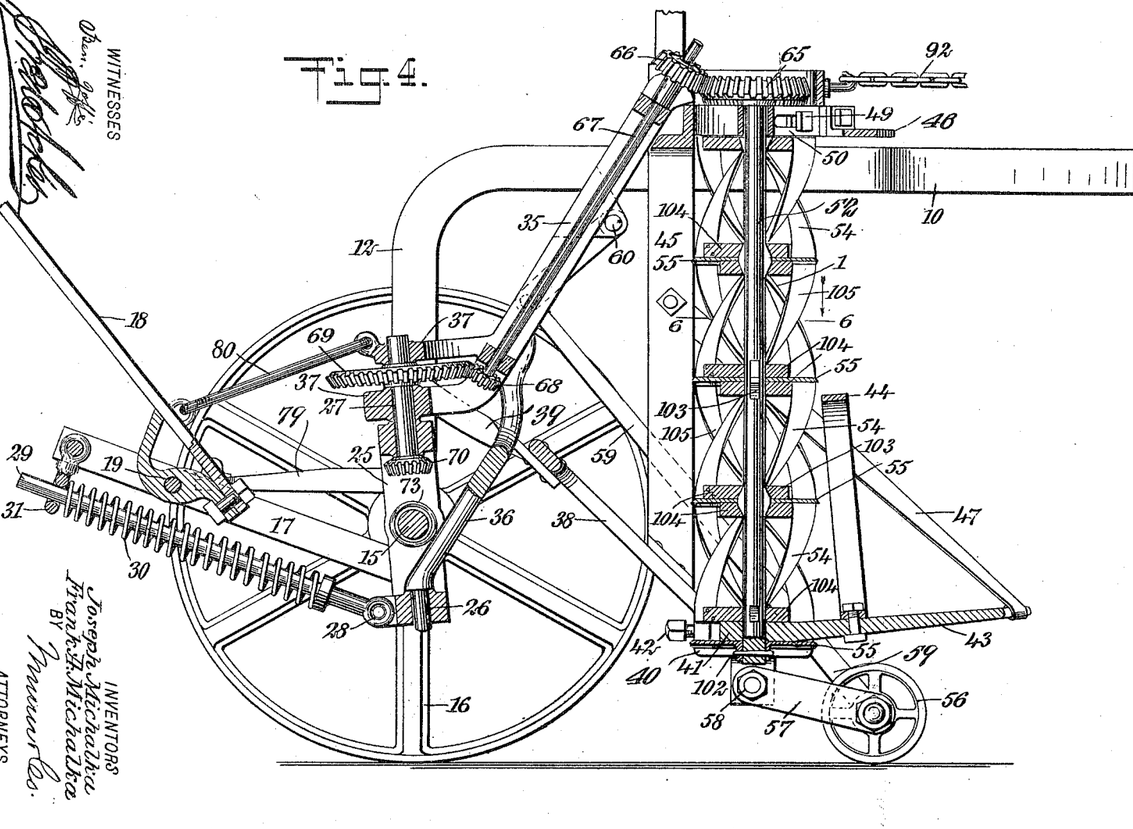
Fig. 4 is a longitudinal vertical section through the machine.

In the preferred arrangement of the cutting mechanism herein shown, the shafts 51 and 52 have their lower ends slightly extended below the plates 41, 41, and the lowermost cutting disks 55, which sever the stalks adjacent to the surface of the ground, are mounted on such depending ends of said shafts, being provided with bosses 102, as shown in Figs. 3 and 4, so that they may be securely pinned or otherwise held upon said shafts. The edges of the disks 55 are adapted to meet after the fashion of the blades of a shear so as to insure effective cutting of the stalks.

By preference, the spiral cutter sections 54 nearest the ground, and whereon the greatest wear and stress is imposed in the operation of the improved machine, will be provided with separately-formed spiral blades 105, 105, screwed or otherwise removably held upon spiders 104, 104, held by means of keys 103 upon the shafts 51 and 52, the spiral cutters being also adapted to overlap each other in the operation of the machine, so as to give a shear cut adapted to effectively sever the stalks. By the arrangement shown, the cutters 105, when dull, worn or broken, may be readily removed and replaced.

The upper disk cutters 55 are similar to the lower disk cutters above described, except that each such disk is held between two adjacent spiral cutter sections 54, 54, the bosses are omitted, and the said upper disks are held to the shafts 51 and 52 by the keys 103 which hold the spiders 104, 104, to turn with said shafts. In some cases, however, and particularly at the upper parts of the shafts 51 and 52, where the cutters are exposed to the least wear and strain, the construction of the cutter shown in Figs. 8 and 9 may be employed with good results. In this construction, the spiral blades are integrally produced upon a hub 106 adapted to be pinned upon the cutter shaft as seen at 107, and the disk cutter 108 is removably supported upon one end of said hub.

In order to uphold the cutting mechanism and the supporting means therefor when the machine is not in use, so as to prevent undue strain upon the parts in transporting the machine to and from the field, we provide a hook 80 upon the seat support 18, adapted to be detachably engaged with an eye on one arm 37 of the frame 35. This hook, when detached, is engageable with a clip 81 on the seat support 18.

From the above description of our improvements, it will be seen that the stalk cutter constructed according to our invention is of an extremely simple and comparatively inexpensive nature, and is particularly well adapted for use by reason of the facility with which the stalks may be cut and of the short lengths into which they may be severed; and it will also be obvious from the above description that the device is susceptible of some modification without material departure from the principles and spirit of the invention, and for this reason we do not desire to be understood as limiting ourselves to the precise form and arrangement of the several parts as herein set forth, in carrying out our invention in practice.

Having thus described our invention, we claim as new and desire to secure by Letters Patent:

1. A machine of the character described, comprising a wheeled frame, cutting mechanism, means for driving the cutting mechanism, adjustable means for supporting said cutting mechanism, and means for adjusting the supporting means to move the cutting mechanism laterally of the path of the machine.

2. A machine of the character described, comprising a wheeled frame, cutting mechanism, means for driving the cutting mechanism, means for supporting said cutting mechanism and capable of adjustment to move the cutting mechanism laterally of the path of the machine, and lever mechanism capable of reverse actuation to vary the adjustment of said supporting means.

3. A machine of the character described, comprising a wheeled frame, cutting mechanism, means for driving the cutting mechanism, and means for adjusting the cutting mechanism to move the same vertically and laterally of the path of the machine.

4. A machine of the character described, comprising a wheeled frame, cutting mechanism having driving means, means for supporting the cutting mechanism and capable of adjustment to move the cutting mechanism vertically and laterally of the path of the machine, and lever mechanism capable of reverse actuation to vary the adjustment of said supporting means.

5. A machine of the character described, comprising a wheel-supported frame, a support having universal movement relative to the frame, and having its forward portion supported upon wheels, cutting mechanism mounted in the support at the front thereof, means for adjusting the support vertically, means for swinging the support laterally, and means for operating the cutting mechanism from the axle of the wheels of the frame.

6. A machine of the character described, a wheel supported frame, a support having universal movement relative to the frame, a rolling support for the forward portion of the first named support, a shaft mounted in the support and operated from the axle of the wheels of the frame, a cutting mechanism carried by the support at the front portion thereof, and means for operating the cutting mechanism from the said shaft.

7. A machine of the character described, comprising a frame, laterally adjustable supporting means carried thereby, parallel driven shafts carried by said supporting means, and cutters carried by the respective shafts with the cutting edges arranged to meet, when the shafts are turned, to sever stalks passed between the cutters.

8. A machine of the character described, comprising a frame, laterally and vertically adjustable supporting means carried thereby, parallel driven shafts carried by said supporting means, and cutters carried by the respective shafts with the cutting edges arranged to meet, when the shafts are turned, to sever stalks passed between the cutters.

9. A machine of the character described, comprising a frame, having a driving axle, a support mounted to swing laterally and vertically with respect to said axle, a rotatable shaft carried by said swinging support, cutting mechanism connected with the swinging support and operated from said shaft, and toothed gearing for driving said shaft from the driving axle.

10. A machine of the character described, comprising a frame, having a driving axle, a frame pivotally mounted for swinging movement on an axle at angles to the length of the driving axle, a rotatable shaft carried by said swinging frame, cutting mechanism connected with the swinging frame and driven from said shaft, and toothed gearing for driving said shaft from the driving axle.

11. A machine of the character described, comprising a main frame having a driving axle, a frame mounted for vertical swinging movement on the main frame, a shaft carried thereby and driven from the axle, another frame mounted for swinging movement on the first-named swinging frame and capable of movement in a direction at right angles to the direction of movement thereof, and cutting mechanism carried by the last-named swinging frame and driven from the shaft on the first-named swinging frame.

12. A machine of the character described, comprising a main frame, having a driving axle, a frame mounted for vertical swinging movement on the main frame, a shaft carried thereby and driven from the driving axle, another frame mounted for lateral swinging movement on the first-named swinging frame, cutting mechanism carried by the last-named swinging frame and driven from the shaft in the first-named swinging frame, and means for controlling the swinging movement of the last-named swinging frame.

13. A machine of the character described, comprising a wheeled frame, cutting mechanism adjustable laterally of the frame and comprising vertically-extended cutter shafts, and means for driving said cutter shafts.

14. A machine of the character described, comprising a wheeled frame, cutting mechanism adjustable laterally of the frame and comprising vertically-extended cutter shafts, means for driving the cutter shafts, and guide projections extended forwardly from said shafts and adapted to engage and guide stalks to be cut, between the cutter shafts.

15. A machine of the character described, comprising a wheeled frame, cutting mechanism adjustable laterally of the frame and comprising vertically-extended cutter shafts, means for driving the cutter shafts, and resilient guide arms extended in front of the cutting mechanism to engage and guide stalks to be cut between the cutter shafts.

16. A machine of the character described, comprising a wheeled frame, cutting mechanism thereon, means for driving the cutting mechanism, and guide projections extended forwardly from the cutting mechanism and movable transversely of the path of the machine to engage and guide stalks to be cut, to the cutting mechanism.

17. In a machine of the character described, a main wheeled frame, a vertically and laterally swinging support carried by the frame, cutting mechanism mounted in the support, swinging arms carried by the support, wheels mounted in the free ends of the arms, and means for adjusting said arms.

18. In a machine of the character described, a wheeled frame, a support carried by the frame, cutting mechanism mounted in the support, swinging arms carried by the support, wheels mounted in the arms, a rock shaft mounted in the support and provided with cranks, links connecting the arms with the cranks, and means for operating said shaft.

19. In a machine of the character described, a wheel supported frame, a frame mounted to swing laterally thereon and provided with lateral lugs, and pivoted levers provided with upwardly projecting arms for engaging the lugs of the said frame.

20. In a machine of the character described, a wheel supported frame having an axle, a frame mounted on the axle, a frame pivoted to the last named frame to swing laterally and provided with laterally projecting lugs, and foot levers pivoted to the frame mounted on the axle and having upwardly projecting arms for engaging the said lugs.

21. In a machine of the character described, a wheel supported frame, an open frame mounted on the axle, a gear wheel on the axle within the open frame, a vertical shaft mounted in the open frame and having a gear wheel meshing with the gear wheel on the axle, a frame mounted on the vertical shaft to swing laterally, a cutting mechanism carried by the laterally swinging frame, and means for operating the cutting mechanism from the said vertical shaft.

22. In a machine of the character described, a wheel supported frame, an open frame mounted on the axle, a gear wheel on the axle within the open frame, a vertical shaft mounted in the open frame and having two gear wheels, one meshing with the gear wheel on the axle, a frame mounted on the vertical shaft to swing laterally, an inclined shaft mounted in the laterally swinging frame and having a gear wheel at one end meshing with the other gear wheel on the vertical shaft, a cutting mechanism carried by the laterally swinging frame, and means for operating the cutting mechanism from the said inclined shaft.

23. In a machine of the character described, a wheel supported frame having an axle, a frame mounted on the axle, a vertical shaft mounted in the frame and having a gear wheel at its lower end, a laterally swinging frame mounted on the said shaft, a cutting mechanism carried by the laterally swinging frame, means for operating the cutting mechanism from the vertical shaft, a gear wheel mounted to slide on but to turn with the axle, said gear wheel being adapted to mesh with the gear wheel on the vertical shaft, a spring normally holding the gear wheel on the axle out of mesh with the gear wheel of the vertical shaft, and a lever for throwing the said gear wheel in mesh with the gear wheel of the shaft.

In testimony whereof we have signed our names to this specification in the presence of two subscribing witnesses.

JOSEPH MICHALKA.
    FRANK A. MICHALKA.

Witnesses:
 F. L. JAHNBIB,
 SIMON SJINNEWEBER.